Oct. 17, 1967   C. S. OLSSON   3,347,748
DEVICE FOR CONTROLLING A CONTROL ROD IN A NUCLEAR REACTOR
Filed March 3, 1966
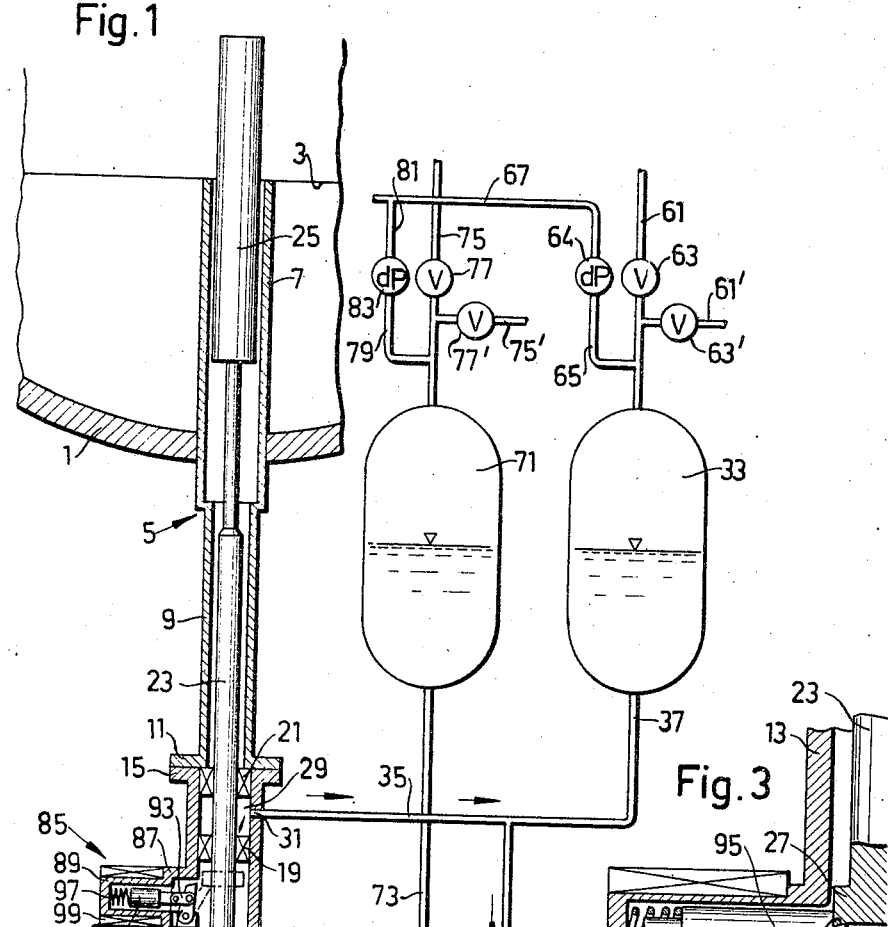
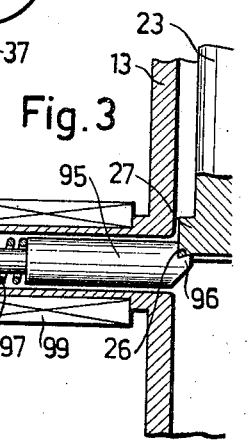
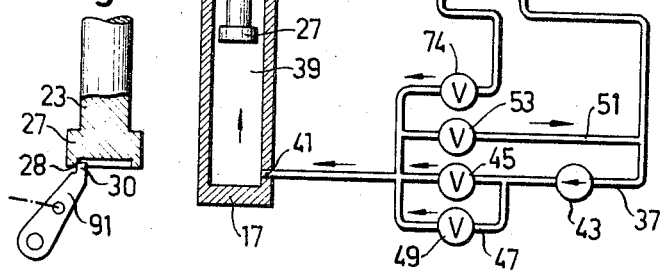

United States Patent Office 3,347,748
Patented Oct. 17, 1967

3,347,748
DEVICE FOR CONTROLLING A CONTROL ROD IN A NUCLEAR REACTOR
Curt Sigvard Olsson, Bandhagen, Sweden, assignor to Aktiebolaget Atomenergi, Stockholm, Sweden, a company of Sweden
Filed Mar. 3, 1966, Ser. No. 531,394
Claims priority, application Sweden, Mar. 25, 1965, 3,902/65
5 Claims. (Cl. 176—36)

ABSTRACT OF THE DISCLOSURE

Apparatus for controlling a control rod in a nuclear reactor comprising a cylinder and a slide axially displaceable in the cylinder and carrying a control rod, first and second sealing means between the slide and the cylinder dividing said cylinder into a space between said first and second sealing means and a lower chamber, a pressure container connected to said space, means for maintaining the pressure in said pressure container substantially equal to the reactor pressure, a conduit connecting said pressure container to said lower chamber and pressure generating means in said conduit.

---

The present invention relates to a device for controlling a control rod in a nuclear reactor.

In nuclear reactors of for instance the pressurized water or boiling type, where the control rods are controlled from outside by means of a separate control fluid it is often a requirement that the control fluid acting against the reactor pressure and thus having a pressure greater than the reactor pressure is prevented from leaking into the coolant of the reactor. The reason for this is for instance that the control fluid is colder than the coolant medium and that it is desirable to prevent contamination of the coolant etc. A usual way of separating the reactor coolant from the control fluid for the control rod consists in arranging a packing box in a tube extending through the wall of the reactor tank, in which packing box a rod or slide travels, which at its inner end is attached to the control rod and at its outer end is actuated by the control fluid. This known device is encumbered with several drawbacks, of which can be mentioned increased leakage and wear at increasing reactor pressure. Moreover, the device is dependent on the reactor pressure in that the pressure of the control fluid must be adapted with regard to the variable counter-pressure in the reactor.

Consequently, it is an object of the present invention to provide a simple, reliable and leak-proof device independent of the reactor pressure, by means of which device the reactor coolant and the control fluid are kept separated.

Another object is to provide an arrangement, by which the control fluid is contained in a closed system separated from the reactor coolant system.

According to the invention the above and other objects are obtained by means of a device comprising a slide for driving a rod, a cylinder in which the slide is axially displaceable between an outer position and an inner position, a first sealing means between the slide and the cylinder dividing the cylinder into an inner chamber subjected to reactor pressure and an outer chamber for a control fluid for the axial displacement of the slide, and a pressure generating means connected to said outer chamber for generating the pressure necessary for said axial displacement and further comprising a second sealing means between the slide and the cylinder, which means together with said first sealing means defines a space connected to a pressure container for control fluid, and means for maintaining the pressure in the container at a value closely corresponding to the reactor pressure. The means for maintaining the pressure in the pressure container may comprise a conduit for connecting the pressure container to a container for pressurized gas, a DP-cell connected to said conduit and a conduit for connecting said DP-cell to the reactor. Moreover, the device of the invention may include a conduit for connecting the pressure container to said outer chamber in the cylinder, in order to form a closed control fluid system, said pressure generating means being a pump means and being provided in said conduit, the pressure container being arranged to form a reservoir for the control fluid.

According to a particular embodiment of the invention the device may comprise a second pressure container subjected to a pressure greater than the reactor pressure, a conduit for connecting said second container to the outer chamber in the cylinder and a solenoid valve provided in said conduit and arranged to open at mains failure, the slide being pushed inwardly to its inner position in view of the pressure release. In this connection the device may also include a locking device comprising a locking means, a spring urging said locking means toward an operable position engaging the slide, a magnetic core connected to said locking means and a solenoid surrounding said core, which solenoid, when energized, urges said locking means toward an inoperable position not engaging the slide against the action of the spring.

The invention will now be further described by an example of an embodiment in connection with the appended drawing, where FIG. 1 partly diagrammatically shows a control device for a control rod in a nuclear reactor and FIGS. 2 and 3 show modified embodiments of a detail of the device.

The device shown in FIG. 1 is adapted to be used in nuclear reactors, where the control rods are inserted from below into the reactor. At the upper part of the figure there is shown a part of the reactor tank 1 and the lower boundary of the reactor core at 3. An elongated cylinder 5 is led through the bottom of the reactor tank 1. The cylinder 5 is open at its upper end and has, a its lower end a flange 11 for connection to a second cylinder 13 by means of a corresponding flange 15 at the upper part of said second cylinder. The cylinder 13 is closed at the lower end by means of a bottom 17. Within the upper part of the cylinder 13 two packing boxes 19, 21 are rigidly mounted, within which a rod or slide 23 is displaceably and sealingly mounted. The slide 23 carries at its upper end an absorption or control rod 25 being within the upper part 7 of the cylinder 5. At its lower end the slide 23 is provided with a widened portion or flange 27.

The packing boxes 19, 21 define a space 29 in the cylinder 13, which space via an opening 31 in the cylinder is connected to a pressure container 33 by means of conduits 35 and 37. The remaining space 39 in the cylinder 13 is by an opening 41 connectable to the pressure container 33 by means of the conduit 37. In this conduit a pump 43 and a solenoid valve 45 are arranged. In parallel therewith a bypass conduit 47 with another solenoid valve 49 is connected to the conduit 37. Another bypass conduit 51 with a third solenoid valve 53 is connected to the conduit 37 in parallel with the pump 43.

The pressure container 33 serves as a reservoir for the control system and is, to half of its volume, filled with control fluid, for instance heavy water. The upper gasfilled part of the container 33 is through a conduit 61 connected to the pressure tube (not shown) containing for instance pressurized nitrogen gas. A solenoid valve 63 is arranged in the conduit 61. A conduit 61' having a solenoid valve 63' is connected to the conduit 61 between the pressure container 33 and the solenoid valve 63. A so-called DP-cell 64 (differential pressure cell) is on one side connected to the upper gasfilled part of the container 33 through a conduit 65 and on the other side to the interior of the reactor tank (reactor pressure) through a conduit 67.

The control system also includes a second pressure container 71, which is connected to the space 39 in the cylinder 13 by means of a conduit 73, in which a solenoid valve 74 is arranged. The upper gasfilled part of the container 71 is similar to the container 33 connected to a pressure tube (not shown) by a conduit 75 through a solenoid valve 77, the connection with the reactor tank consisting in conduits 79, 81 and a DP-cell 83. A conduit 75' having a solenoid valve 77' is connected to the conduit 75 between the pressure container 71 and the valve 77.

In connection with the cylinder 13 there is a locking device 85, which is positioned in a casing 87 arranged in the cylinder wall and outwardly turning into a cylindrical horizontal part 89. The device comprises a locking arm 91, which at its lower end is pivotally mounted within the casing, an intermediate member 93 journalled in the intermediate part of the locking arm and at its other end being journalled in a magnetic core 95, and a coil spring 97 mounted between the core 95 and the bottom of the cylindrical part 89. A coil or solenoid 99 surrounds the cylindrical part 89 of the casing 87. The coil can be supplied with electric current through electric conduits 101.

The operation of the control device is the following:

At normal operating conditions the control rod 25 is assumed to have a position of equilibrium according to FIG. 1. The pressure container 33 is maintained at a pressure closely corresponding to the pressure in the reactor by having the DP-cell 64 adjusted on the desired value 0 with regard to the pressure difference between the reactor tank and the pressure container 33. Thus the DP-cell 64 controls by means of the solenoid valve 63 the supply of nitrogen gas to and by means of the solenoid valve 63' the release of nitrogen gas from the container 33 so as to maintain said condition. By means of the pump 43 a pressure increase is provided in the space 39, which increase is sufficient to compensate for leakage past the packing box 19, so that the control rod 25 is held in the desired position.

As mentioned a certain leakage is at hand at the packing box 19 from the space 39 into the space 29 in view of the pressure difference over the packing box. Owing to the fact that the pressure in the space 29 very closely corresponds to the pressure in the reactor no leakage is at hand at the packing box 21, due to which the reactor coolant and the control fluid are entirely separated. As the pressure in the control system is based on the reactor pressure and varies completely synchronously, which is effected by means of the DP-cell 64, the control of the control rod is wholly independent of the reactor pressure due to which, at otherwise constant conditions, the position of the control rod 25 remains unchanged.

In said operating condition the valves 47, 53 and 74 are closed and the position of the valve 45 is adapted to the desired position of the control rod 25. If the control rod 25 is to be raised, valve 49 is opened and, vice versa, if the control rod is to be lowered, valve 53 is opened.

The pressure container 71 is intended for emergency conditions and the DP-cell 83 is adjusted on such a desired conditions that the pressure in the container exceed the reactor value pressure with a certain predetermined value. At emergency conditions, for instance mains failure, when it is desired rapidly to shut down the reactor, valve 74 is opened and in view of the over-pressure in container 71, which like the container 33 is filled with control fluid to about half of the volume, the control rod 25 is rapidly inserted into the reactor core, the reactor being shut down. As the solenoid 99 of the locking device 85 has been demagnetized due to the mains failure, the locking arm 91 has been brought out into an operable position by the action of the spring 97, due to which the slide 23 after the flange 27 having passed the locking arm is kept locked in its upper position (see the position in FIG. 1 indicated with phantom lines). By this arrangement the control rod is prevented from leaving the core, should the pressure in container 71 fall down to a value below the reactor pressure.

In FIG. 2 a somewhat modified embodiment of the locking mechanism is shown. The flange 27 of the slide 23 is here provided with a downwardly protruding edge 28 and the locking arm 91 is at its free end provided with a protruding nose 30. When the slide has been brought to its upper position so as to bring the nose 30 into engagement with the edge 28, disconnecting of the locking device is prevented when unintentionally energizing the solenoid. In order to bring about such a disconnection the slide 23 will have to be raised a distance, while energizing the coil 99.

In FIG. 3 another modified embodiment of the locking mechanism is shown. The core 95 is here at its outer end formed to a locking extension 96 cooperating with the flange 27 on the slide 23. Also here disconnection of the locking device, when unintentionally energizing the solenoid, is prevented by having the locking extension 96 and the flange 27 at 26 bevelled, so as to engage with each other.

The above examples have been described in connection with one control rod only, but in the practical application of the invention a plurality of control rods with appendant control systems are arranged in the reactor. As in the above examples each control rod can be controlled with a separate system, but also a group of control rods can be operated with one and the same system if this is in conformity with the operational requirements and the safety philosophy.

The invention has herein been described in connection with a pressurized water reactor, but it is applicable also to other reactors, where the coolant is pressurized.

What is claimed is:

1. Apparatus for controlling a control rod in a nuclear reactor comprising a nuclear reactor having a reactor tank, a cylinder open at its upper end and closed at its lower end extending upwardly through the bottom of said tank, a slide axially displaceable in said cylinder, a control rod carried by one end of said slide within said tank, a first sealing means between said slide and said cylinder dividing said cylinder into an upper chamber subject to the pressure in said reactor tank, a second sealing means between said slide and said cylinder and spaced from said first sealing means dividing the remainder of said cylinder into a space between said first and second sealing means and a lower chamber, a pressure container containing control fluid connected to the space in said cylinder between said first and second sealing means, means for maintaining the pressure in said pressure container substantially equal to the pressure in said reactor tank, a conduit connecting said pressure container to said lower chamber and pressure generating means in said conduit.

2. Apparatus as defined in claim 1 in which said means for maintaining the pressure in said pressure container comprises a first conduit connecting said pressure container to a source of gas under pressure, a DP-cell connected to said first conduit and a second conduit connecting said differential pressure cell to said reactor tank.

3. Apparatus as defined in claim 1 comprising a second pressure container containing control fluid, means for maintaining the pressure in said second pressure container greater than the pressure in said reactor tank, a conduit connecting said second pressure container to said lower chamber of said cylinder and a solenoid valve in said conduit arranged to open upon main failure.

4. Apparatus as defined in claim 1 comprising a locking device for said slide, said locking device comprising a locking arm positioned to move into and out of engagement with said slide, a spring tensioned to urge said locking arm into engagement with said slide, a magnetic core connected to said locking arm and a solenoid surrounding said core, said solenoid when energized operating against said spring and acting to move said locking arm out of contact with said slide.

5. Apparatus as defined in claim 4 in which said slide comprises latching means cooperating with said locking arm.

References Cited

UNITED STATES PATENTS

| | | | |
|---|---|---|---|
| 3,154,472 | 10/1964 | Shannon | 176—36 |
| 3,162,578 | 12/1964 | Allen | 176—36 |
| 3,162,579 | 12/1964 | Thomas et al. | 176—36 |
| 3,170,844 | 2/1965 | Nicoll | 176—36 |

CARL D. QUARFORTH, *Primary Examiner.*

H. E. BEHREND, *Assistant Examiner.*